United States Patent
Funatsu et al.

(10) Patent No.: US 8,175,402 B2
(45) Date of Patent: May 8, 2012

(54) DRAWING APPARATUS

(75) Inventors: Terunobu Funatsu, Hitachinaka (JP); Yoshihisa Osaka, Ebina (JP); Hitoshi Ikegami, Ebina (JP)

(73) Assignee: Hitachi Via Mechanics, Ltd., Ebina-shi (JP)

(*) Notice: Subject to any disclaimer, the term of this patent is extended or adjusted under 35 U.S.C. 154(b) by 1053 days.

(21) Appl. No.: 12/033,549

(22) Filed: Feb. 19, 2008

(65) Prior Publication Data

US 2008/0244158 A1     Oct. 2, 2008

(30) Foreign Application Priority Data

Mar. 30, 2007 (JP) ................. 2007-092837

(51) Int. Cl.
*G06K 9/46* (2006.01)
(52) U.S. Cl. .......... 382/245; 382/246; 345/557
(58) Field of Classification Search .......... 345/501–574; 382/141–152, 232–253; 703/13–14
See application file for complete search history.

(56) References Cited

U.S. PATENT DOCUMENTS

| | | | | |
|---|---|---|---|---|
| 5,761,075 | A * | 6/1998 | Oi et al. ............... | 716/55 |
| 5,850,632 | A * | 12/1998 | Robertson ............. | 711/170 |
| 7,692,808 | B2 * | 4/2010 | Takahashi ............. | 358/1.15 |
| 2005/0205781 | A1 * | 9/2005 | Kimba ................. | 250/311 |

FOREIGN PATENT DOCUMENTS

| | | |
|---|---|---|
| JP | 05-050666 | 3/1993 |
| JP | 08-324040 | 12/1996 |
| JP | 9-214709 A | 8/1997 |

OTHER PUBLICATIONS

Capon, Jack, "Probabilistic Model for Run-Length Coding of Pictures", IRE Transactions on Information Theory, vol. 5, issue 12, pp. 157-163, 1959.*

* cited by examiner

*Primary Examiner* — Daniel Washburn
*Assistant Examiner* — Donna Ricks
(74) *Attorney, Agent, or Firm* — Crowell & Moring LLP

(57) ABSTRACT

A drawing apparatus which can create an exposure pattern rapidly. The drawing apparatus has a raster conversion processing module for converting vector images as wiring patterns into bitmap image data, an image cache module for temporarily storing a predetermined-size cached image supplied from the raster conversion processing module, a first compression module for compressing the cached image stored in the image cache module, a second compression module for compressing the cached image stored in the image cache module in a compression ratio differing from that of the first compression module, a comparison module for comparing data sizes of compressed data generated by the first and second compression modules and selecting one having a smaller data size, a memory access module for writing the compressed data selected by the comparison module, into a storage module, and a cache region control module for controlling a compression status of the cached image.

3 Claims, 4 Drawing Sheets

011 101 101 101 101 101 100
00011 00101 00101 00101 00101 00101 00100

111 111 000 111 000 111 100
00111 11001

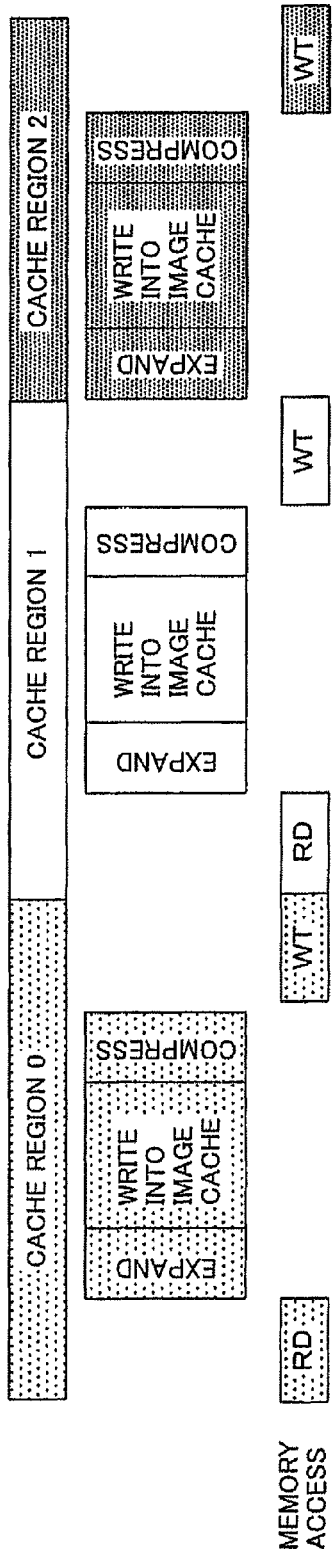
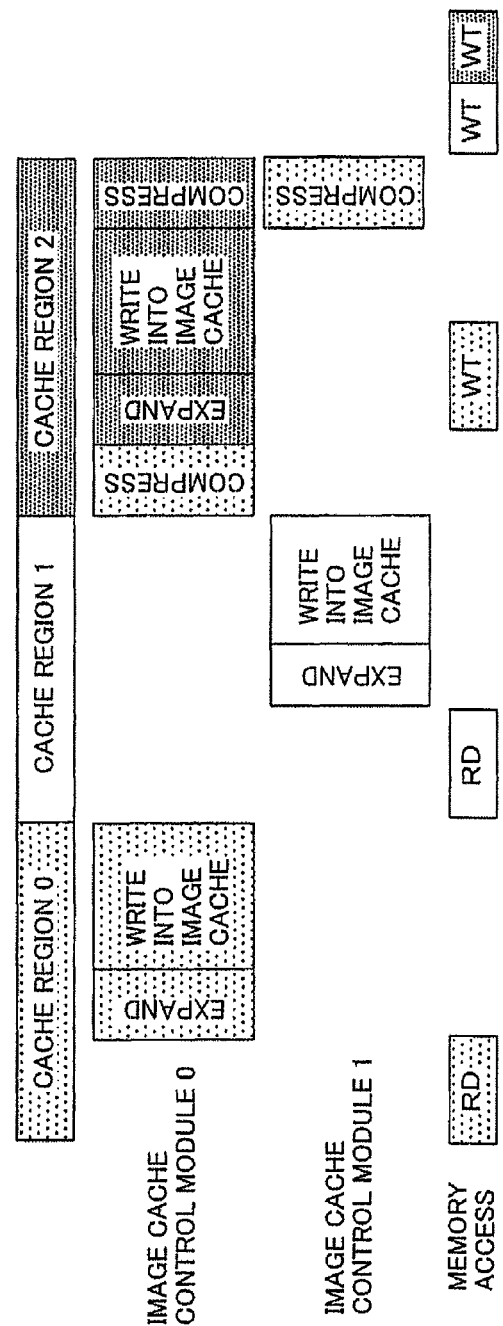
FIG. 4A
FIG. 4B

DRAWING APPARATUS

FIELD OF THE INVENTION

The present invention relates to a drawing apparatus by which a wiring pattern designed by a CAD or the like is converted into an exposure pattern (bitmap image data) in a process for manufacturing a printed circuit board.

BACKGROUND OF THE INVENTION

A direct exposure system which is one of exposure systems is a system for exposing a printed circuit board to draw a wiring pattern without using any mask. For the exposure, the direct exposure system uses a drawing apparatus by which the wiring pattern designed by a CAD or the like is converted into an exposure pattern matched to the exposure system (this conversion will be referred to as "raster conversion"). The wiring pattern is composed of a set of line segments (vector images) showing the outline of a figure and expressed in a vector format. On the other hand, the exposure pattern is composed of a set of binary (for example, white and black) data (bitmap image data) having a size corresponding to exposure resolution. One binary value is assigned for a to-be-exposed pixel, and the other binary value is assigned for a non-exposed pixel.

In printed circuit boards to be exposed, deformation such as bending, expansion or contraction may occur due to their ambient environment or the like. Each printed circuit board may have its own deformation. In order to improve the yield in manufacturing the printed circuit boards, it is preferable that deformation of each printed circuit board is detected, and an exposure pattern is corrected in accordance with the detected deformation. For the correction of the exposure pattern, it is efficient in view of computational complexity to correct vector images. However, such correction needs to perform the raster conversion in real time. Therefore, it is indispensable to make the raster conversion faster in order to improve the throughput in manufacturing the boards.

The size of the bitmap image data required for exposure has been increasing due to getting a wiring pattern more precise. It is therefore desired to use a high-capacity, low-priced and fast DRAM as a memory for storing the bitmap image data. On the other hand, a wiring pattern is a two-dimensional image and the memory address of a DRAM is one-dimensional. Therefore, random accesses may often occur while the bitmap image data obtained by raster conversion of the wiring pattern are stored into the DRAM. However, since DRAMs are efficient for burst accesses, the accessing efficiency deteriorates when the bitmap image data are stored into the DRAM. To solve this problem, the following method is used by way of example. That is, a part of the bitmap image data stored in the DRAM is read and cached into a cache in burst access. The cache is constituted by an SRAM to which random accesses can be made easily. The raster-converted bitmap image data are read from and written into the cache in random access. Subsequently the cached bitmap image data are written back to the DRAM in a lump. Thus, the efficiency in access to the DRAM can be improved.

For improvement of the efficiency in access to a DRAM, there is a method in which the bitmap image data are compressed and expanded when a part of the bitmap image data is read and written between a cache and the DRAM, so that the size of data read from and written into the DRAM can be reduced (Patent Document 1).

Patent Document 1: JP-A-9-214709 (FIG. 1)

In a drawing apparatus as an exposure system, the yield in manufacturing printed circuit boards is affected by an error of one bit. Therefore, irreversible compression cannot be applied to compression and expansion of bitmap image data between a cache and a DRAM.

For example, run-length encoding (hereinafter referred to as "RLE compression") is one of reversible methods of compressing bitmap image data. According to such a method, however, the size of compressed data may be larger than the size of its original data when there is a particular relationship between the compression unit size and the pattern of the bitmap image data. The efficiency in access to the DRAM cannot be always improved.

SUMMARY OF THE INVENTION

An object of the present invention is to solve the foregoing problem. Another object of the present invention is to provide a drawing apparatus which can reduce the size of compressed data of bitmap image data reliably and which can deal with the compressed data efficiently enough to create an exposure pattern rapidly.

In order to attain the foregoing objects, the present invention provides a drawing apparatus including: a raster conversion processing module for converting a wiring pattern, which is of vector images, into bitmap image data; an image cache module for temporarily storing a predetermined-size cached image supplied from the raster conversion processing module; a first compression module for compressing the cached image stored in the image cache module; a second compression module for compressing the cached image stored in the image cache module in a compression ratio differing from a compression ratio of the first compression module; a comparison module for comparing the data size of compressed data generated by the first compression module and the data size of compressed data generated by the second compression module and selecting one having the smaller data size; a memory access module for writing the compressed data selected by the comparison module, into a storage module; and a cache region control module for controlling a compression status of the cached image.

In this case, a compression unit size of the first compression module may be matched to a minimum line width of the wiring pattern.

It is also preferable that, when the compressed data selected by the comparison module are of a cached image filled with only white or black, the compressed data are not written into the storage module but a parameter showing that the compressed data are of a cached image filled with only white or black is registered in the cache region control module.

Further, the drawing apparatus may also includes: a plurality of image cache control modules each having the image cache module, the first compression module, the second compression module and the comparison module; and a cache switch module disposed between the plurality of image cache control modules and the memory access module so as to switch from a channel between one of the image cache control modules and the memory access module to a channel between another and the memory access module.

It is possible to reduce the size of compressed data of bitmap image data reliably and it is also possible to deal with the compressed data efficiently enough to create an exposure pattern rapidly.

BRIEF DESCRIPTION OF THE DRAWINGS

FIGS. 4A and 4B are time charts showing a flow of processing according to the present invention.

DETAILED DESCRIPTION OF THE EMBODIMENTS

Embodiments of the present invention will be described below with reference to the drawings.

First Embodiment

Figure 1:
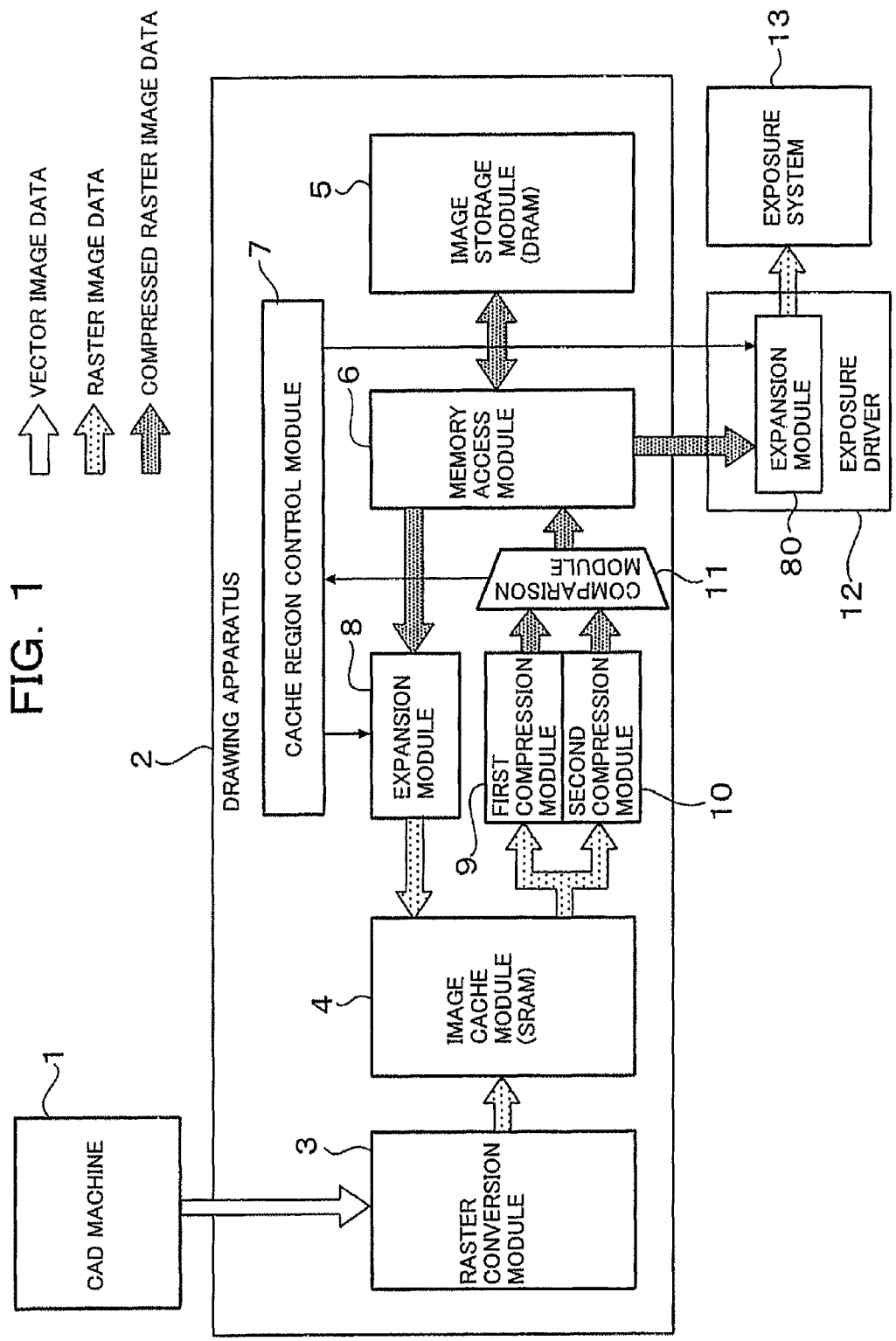
FIG. 1 is a diagram showing the configuration of a drawing apparatus according to a first embodiment of the present invention.

FIG. 1 is a diagram showing the configuration of a first embodiment of the present invention.

A drawing apparatus 2 surrounded by a rectangle in FIG. 1 has a raster conversion processing module 3, an image cache module (SRAM) 4, a first compression module 9, a second compression module 10, a comparison module 11, a memory access module 6, an image storage module (DRAM) 5, a cache region control module 7 and an expansion module 8. The raster conversion processing module 3 is connected to a CAD machine 1. The memory access module 6 and the cache region control module 7 are connected to an expansion module 80. The expansion module 80 is connected to an exposure system 13.

Next, the operation of the CAD drawing apparatus according to this embodiment will be described.

The CAD machine 1 supplies data (vector image data) to the raster conversion processing module 3 of the drawing apparatus 2. By the supplied vector image data, wiring patterns described in a design drawing can be drawn as figures respectively. Based on the supplied vector image data, the raster conversion processing module 3 converts the vector image data into bitmap image data (raster image data) figure by figure, and segments the obtained bitmap image data into regions (hereinafter referred to as "cache regions") each having a predetermined size. For each segmented cache region, a position of the cache region in the design drawing and bitmap image data of a figure belonging to the cache region are supplied to the image cache module 4. On supplying a processing result of one figure to the image cache module 4, the raster conversion processing module 3 deletes the result and performs processing for the next figure.

A. The Case where One Wiring Pattern has been Described in a Design Drawing

Before reading a new design drawing, the cache region control module 7 sets an initial value (white in this case) to all the data stored in the image storage module 5, and then writes white into the image cache module 4 through the expansion module 8.

When white is written into the image cache module 4, the image cache module 4 writes bitmap image data (black here) supplied from the raster conversion processing module 3, into corresponding places. Places where there is no image data are left default (white). When all the bitmap image data in the corresponding region are written (in a manner of logical sum) into the image cache module 4, the image cache module 4 outputs the supplied bitmap image data to the first compression module 9 and the second compression module 10.

The first compression module 9 and the second compression module 10 RLE-compress the bitmap image data supplied from the image cache module 4, and output their results to the comparison module 11. The compression will be described in detail later.

When the data supplied from the first compression module 9 and the second compression module 10 are composed of data of only white or black, the comparison module 11 outputs the position of the cache region in the design drawing and a parameter indicating the type (i.e. white or black) of the data to the cache region control module 7. Otherwise the comparison module 11 outputs the position of the cache region and a parameter indicating the type (i.e. compressed data) of the data to the cache region control module 7. At the same time the comparison module 11 compares the size of the data outputted from the first compression module 9 and the size of the data outputted from the second comparison module 10. The comparison module 11 also supplies the compressed data having the smaller data size, the data size (that is, how many bits the data have) and the position of the cache region to the memory access module 6. The memory access module 6 writes (stores) the compressed data into the image storage module 5.

Exposure data are stored into the image storage module 5 in a format where a bitmap is RLE-compressed. In this case, the exposure data are divided into regions (cache regions) each having a size as large as the capacity of the image cache module 4. The memory access module 6 makes access to the image storage module 5 by the bitmap image (cached image) unit size by which the bitmap has been divided and stored in the cache regions.

The following processing is performed when there are image data about another cache region.

The cache region control module 7 confirms the status of data in the corresponding region. In this case, the status of the data in the cache region is one of "all white", "all black" or "compressed data". Here, the status of the data is registered in advance in the cache region control module 7. Accordingly, the cache region control module 7 confirms the type of the data in the cache region. Here, the type of the data is "all white", which is the initial value. The cache region control module 7 writes the initial value white into the image cache module 4 through the expansion module 8 without reading the data contents of the image storage module 5.

Data in the cache region are processed in the same manner as mentioned above. This operation is repeated till all the vector image data about the corresponding pattern are processed.

When all the vector image data are raster-converted, the exposure driver 12 reads the RLE-compressed cached images from the image storage module 5 through the memory access module 6 sequentially. The read images are expanded into uncompressed cached images by the expansion module 80, and then supplied to the exposure system 13. In this event, the cache region control module 7 is referred to. When a cache region is filled with white or black, no data are read from the image storage module 5, but a cached image filled with white or black is created by the expansion module 8. The exposure system 13 performs exposure based on bitmap image data which are a set of such cached images.

B. The Case where a Plurality of Wiring Patterns have been Described in the Design Drawing Usually a plurality of patterns are described in the design drawing. On and after the second pattern, new data may be written in a cache region where another pattern has been written. The first pattern is processed in the same manner as in the case A. Description about the first pattern will be therefore omitted. How the second pattern is processed will be described.

For the second pattern, the cache region control module 7 confirms the status of data in a corresponding cache region. When the status of the data in the cache region is "all white" or "all black", the cache region control module 7 writes white or black into the image cache module 4 through the expansion module 8 without reading the data contents of the image storage module 5. When the status of the data in the cache region is "compressed data", compressed data stored in the image storage module 5 are read through the memory access module 6, and a cached image expanded by the expansion module 8 is written into the image cache module 4.

The aforementioned operation is repeated till all the vector image data about the corresponding pattern are processed. When all the vector image data are raster-converted, the exposure driver 12 reads the RLE-compressed cached images from the image storage module 5 through the memory access module 6 sequentially. The read images are expanded into uncompressed cached images by the expansion module 80, and then supplied to the exposure system 13. In this event, the cache region control module 7 is referred to. When a cache region is filled with white or black, no data are read from the image storage module 5, but a cached image filled with white or black is created by the expansion module 8. The exposure system 13 performs exposure based on bitmap image data obtained thus.

Next, the procedure of compression will be described in detail.

RLE compression is applied to each line of a bitmap image as follows. That is, for each line, a bit string having consecutive white or black bits is converted into a combination of information indicating either white or black and information of the number of consecutive white or black bits. Thus, the data size is reduced.

Figure 2A:
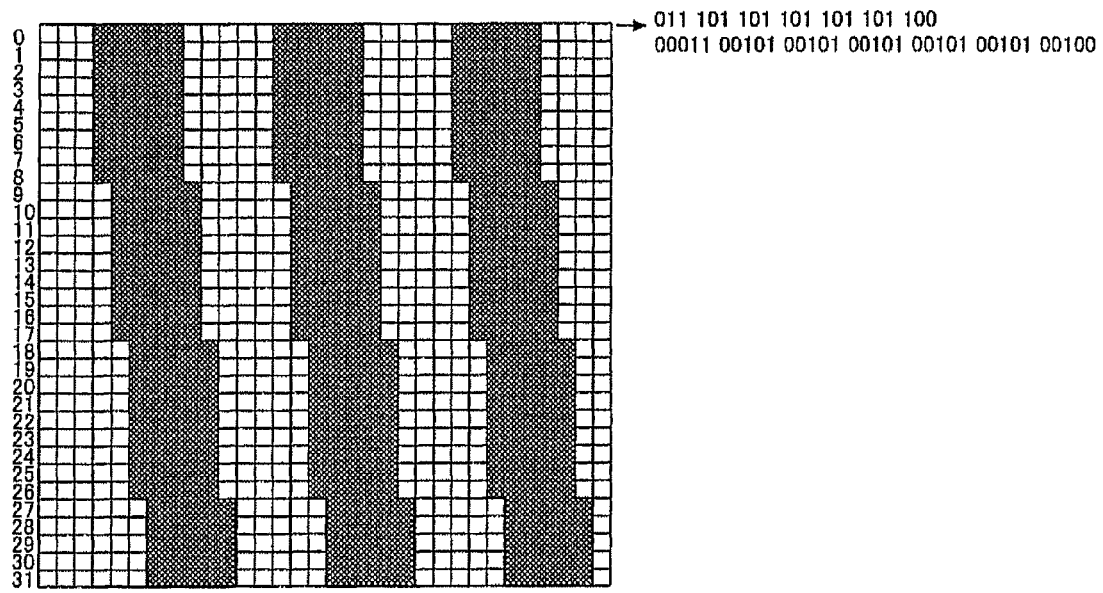
FIGS. 2A and 2B are diagrams for explaining a compression unit size and a compression result.
Figure 2B:
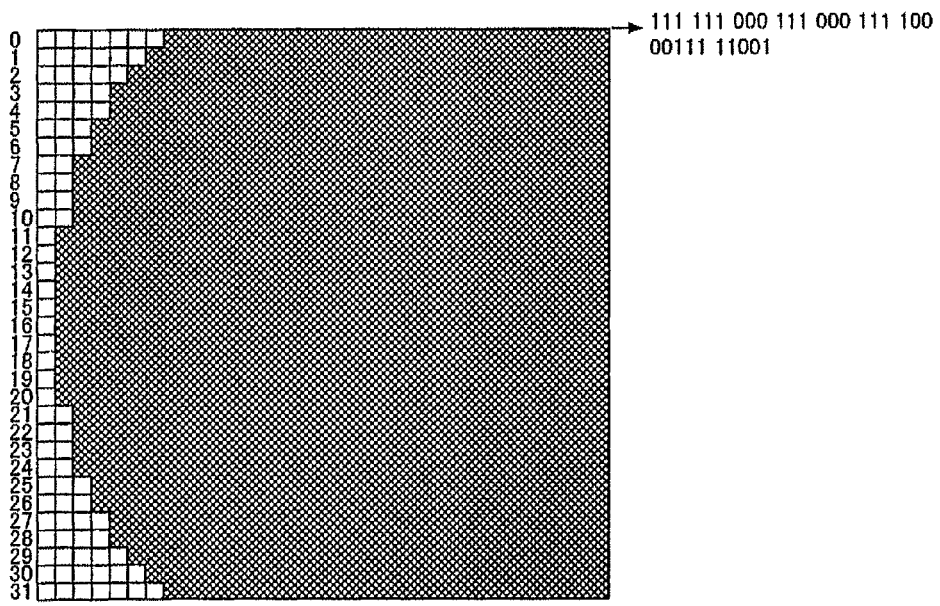

FIGS. 2A and 2B show examples of bitmap image data in a cache region. FIG. 2A shows a case where white portions and black portions are mixed. FIG. 2B shows a case where the number of bits of black portions is much larger than the number of bits of white portions.

Here assume that compressed data are produced in the following rules.
(1) Compression is started at the top line and performed line by line.
(2) Compression is started at the left of each line until reaching the right end, and moved to the next line as soon as the compression is completed.
(3) The number of consecutive white or black bits is counted from the left to the right in each line, and the counted number is outputted whenever white or black changes to black or white.
(4) The first one of compressed data of each line represents the number of consecutive white bits, and it is 0 when the first bit of the line is not white.

It is assumed that under the aforementioned rules the first compression module 9 compresses data in the compression unit size of 3 bits (that is, consecutive numbers 0-7 can be counted by one compressed datum), and the second compression module 10 compresses data in the compression unit size of 5 bits (that is, consecutive numbers 0-31 can be counted by one compressed datum).

Figure 3:
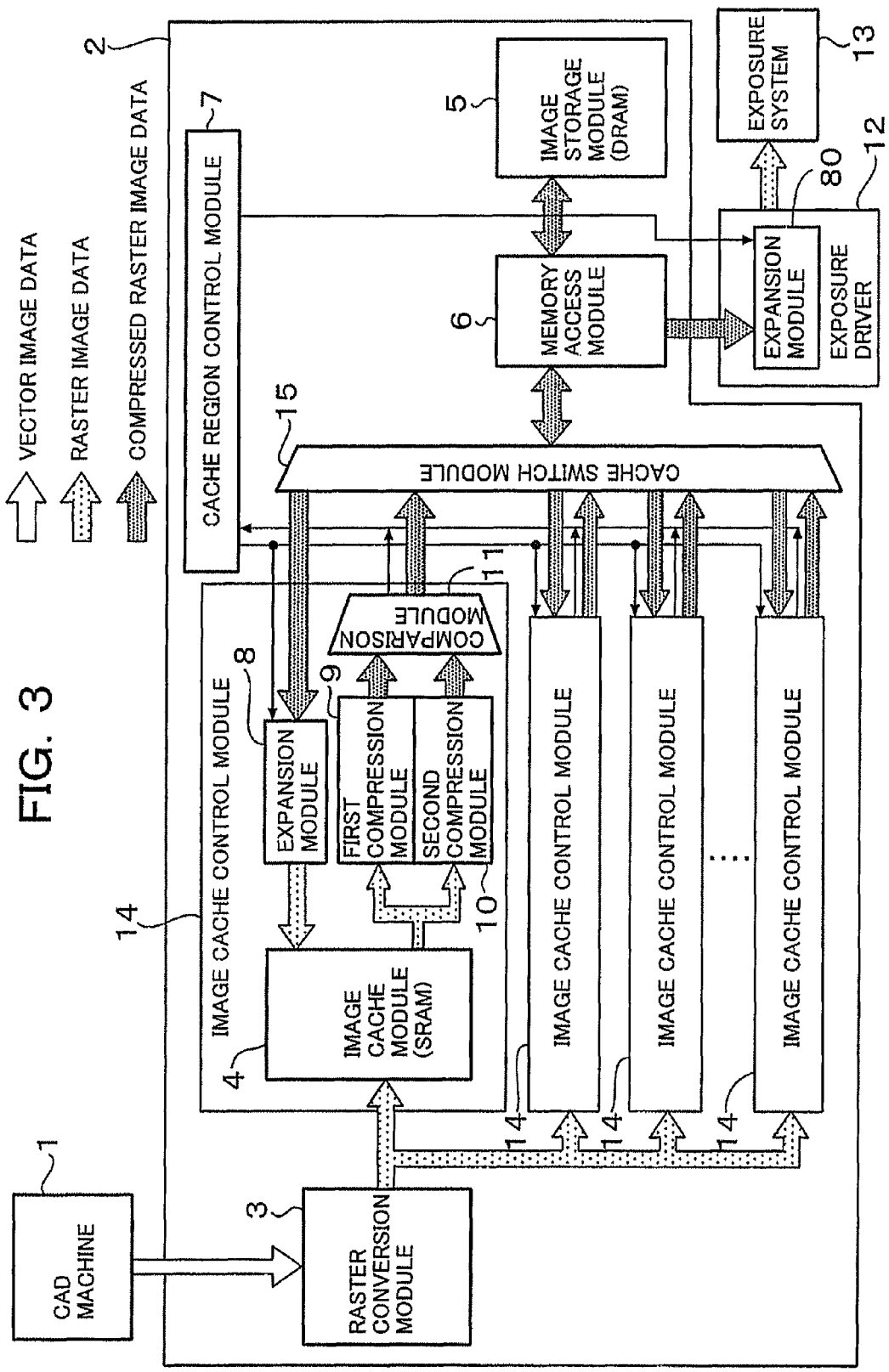
FIG. 3 is a diagram showing the configuration of a drawing apparatus according to a second embodiment of the present invention.

In FIG. 2A, 3 white bits, 5 black bits, 5 white bits, 5 black bits, 5 white bits, 5 black bits and 4 white bits line up in the first line. When the first line is compressed in the compression unit size of 3 bits, compressed data are expressed by 011, 101, 101, 101, 101 and 100 as shown in the margin of FIG. 2A. On the other hand, when the first line is compressed in the compression unit size of 5 bits, compressed data are expressed by 00011, 00101, 00101, 00101, 00101, 00101, 00101 and 00100 as shown in the margin of FIG. 2A. In this case, when compression is performed in the compression unit size of 3 bits makes, the volume of the compressed data becomes smaller, and the number of times of access to the memory can be reduced. For example, the expansion modules 8 and 80 expands the line of the compressed data 011, 101, 101, 101, 101, 100 into the line of an image of 3 white bits, 5 black bits, 5 white bits, 5 black bits, 5 white bits, 5 black bits and 4 white bits arranged in this order.

In FIG. 2B, 7 white bits and 25 black bits line up in the first line. When the first line is compressed in the compression unit size of 3 bits, compressed data are expressed by 111, 111, 000, 111, 000, 111 and 100 as shown in the margin of FIG. 2B. On the other hand, when the first line is compressed in the compression unit size of 5 bits, compressed data are expressed by 00111 and 11001 as shown in the margin of FIG. 2B. In this case, when compression is performed in the compression unit size of 5 bits, the volume of the compressed data becomes smaller, and the number of times of access to the memory can be reduced.

In this embodiment, the first compression module 9 is designed to compress data in a compression unit size corresponding to the minimum line width of a wiring pattern, and the second compression module 10 is designed to compress data in a compression unit size larger than that of the first compression module 9. Third and fourth compression modules using compression unit sizes different from those of the first and second compression modules 9 and 10 may be added. In such a manner, the data volume can be made smaller.

Second Embodiment

FIG. 3 is a configuration diagram of a drawing apparatus according to a second embodiment of the present invention.

The drawing apparatus according to the second embodiment has a plurality of image cache control modules 14. Each image cache control module 14 includes the image cache module 4, the expansion module 8, the first compression module 9, the second compression module 10 and the comparison module 11 shown in FIG. 1. Further, a cache switch module 15 is provided between the plurality of image cache control modules 14 and the memory access module 6.

The operation of the drawing apparatus according to the second embodiment differs from that according to the first embodiment as follows. That is, a bitmap image in another cache region than a cache region expanded in the image cache module 4 may be generated by the raster conversion processing module 3. In this case, a cached image in the expanded cache region is not written back into the image storage module 5, but a cached image in the new cache region is expanded in the image cache module 4 of another image cache control module 14.

In this case, when one of the image cache modules 4 is not in use, a cached image of any cache module 4 is not written back into the image storage module 5 even if a bitmap image of a new cache region is generated by the raster conversion processing module 3. Only when a cached image of a new cache region is generated in the state where all the image cache modules 4 of the image cache control modules 14 are in use or when all the wiring patterns are converted into bitmap image data by the raster conversion processing module 3, cached images of the image cache control modules 14 are written back into the image storage module 5. The cache switch module 15 switches from a channel between one of the image cache control modules 14 and the memory access module 6 to a channel between another and the memory access module 6 so as to establish connection therebetween.

According to this embodiment, a plurality of cache regions can be expanded into the image cache modules 4 simultaneously. Thus, processing for writing bitmap image data into the image cache modules 4, processing for compressing the bitmap image data, processing for expansion and processing for memory access can be executed in parallel. It is therefore possible to perform memory access efficiently.

FIGS. 4A and 4B are time charts showing a procedure for processing bitmap image data of three different cache regions 0, 1 and 2. FIG. 4A shows a case according to the first embodiment, and FIG. 4B shows a case according to the second embodiment. In the second embodiment, assume that there are two image cache control modules 14. In each of FIGS. 4A and 4B, the upper row designates cache regions, the middle row or the two middle rows designate the contents of processing, and the lower row designates the contents of access to the image storage module 5. The reference sign RD designates processing of reading from the image storage module 5, and WT designates processing of writing into the image storage module 5. For example, the cache region 2 is a cache region filled with white or black. Therefore, no memory access for reading from the image storage module 5 occurs in the cache region 2.

As shown in FIG. 4A, the three cache regions are processed in series in the first embodiment. On the other hand, in the second embodiment, as shown in FIG. 4B, a cached image of the cache region 0 is not written back into the image storage module 5 immediately after the processing of the cache region 0 is terminated, but the cache image can be written back into the image storage module 5 in parallel with the processing of the cache region 2 while the cache region 2 is processed. In such a manner, a plurality of image cache processing modules 14 are provided so that processing can be performed partially in parallel. Thus, the memory access to the image storage module 5 can be performed efficiently.

The invention claimed is:

1. A drawing apparatus comprising:
a raster conversion processing module for converting a wiring pattern, which is a vector image, into a bitmap image data;
an image cache module for temporarily storing a predetermined-size cached image supplied from the raster conversion processing module;
a first compression module for compressing the cached image stored in the image cache module according to Run-Length Encoding (RLE compression) in which a compression unit size is matched to a minimum line width of the wiring pattern;
a second compression module for compressing the cached image stored in the image cache module in a compression unit size larger than that of the first compression module with the same RLE compression as the first compression module in use;
a comparison module for comparing the data size of compressed data generated by the first compression module and the data size of compressed data generated by the second compression module and selecting one having the smaller data size;
a memory access module for writing the compressed data selected by the comparison module, into a storage module;
a cache region control module for registering and controlling a type of data indicating a position of a cache region, and indicating white, black or compressed data of the cached image; and
an expansion module for confirming the type of data and writing the cached image expanded by the expansion module into the image cache module.

2. A drawing apparatus according to claim 1, wherein when the compressed data selected by the comparison module are of a cached image filled with only white or black, the compressed data are not written into the storage module but a parameter showing that the compressed data are of a cached image filled with only white or black is registered in the cache region control module.

3. A drawing apparatus according to claim 1 further comprising:
a plurality of image cache control modules each having the image cache module, the first compression module, the second compression module and the comparison module; and
a cache switch module disposed between the plurality of image cache control modules and the memory access module so as to switch from a channel between one of the image cache control modules and the memory access module to a channel between another and the memory access module.

* * * * *